United States Patent [19]

Suzuki

[11] Patent Number: 4,551,660

[45] Date of Patent: Nov. 5, 1985

[54] MOTOR CONTROLLING SWITCH DEVICE

[75] Inventor: Masaru Suzuki, Aichi, Japan

[73] Assignee: Kabushiki Kaisha Tokai Rika Denki Seisakusho, Japan

[21] Appl. No.: 627,638

[22] Filed: Jul. 3, 1984

[30] Foreign Application Priority Data

Jul. 4, 1983 [JP] Japan ................................ 58-121466

[51] Int. Cl.[4] ........................ H02P 1/22; H01H 71/18; H01H 83/22

[52] U.S. Cl. ...................................... 318/293; 200/12; 200/339; 335/15; 335/18; 335/145; 335/155; 335/268; 337/134; 337/140; 361/187; 361/210; 318/280

[58] Field of Search .................. 318/280, 293; 200/12, 200/339; 335/268, 11, 15, 18, 37, 68, 76, 106, 155, 145, 146, 143, 186; 361/187, 194, 206, 210; 307/117; 337/54, 134, 140, 395

[56] References Cited

U.S. PATENT DOCUMENTS

| | | | |
|---|---|---|---|
| 1,701,357 | 2/1929 | Butler | 361/194 X |
| 2,050,879 | 8/1936 | Erben | 337/54 X |
| 2,777,915 | 1/1957 | Hussey | 335/155 X |
| 3,652,969 | 3/1972 | Willson et al. | 337/140 |
| 3,968,380 | 7/1976 | Jost et al. | 337/140 X |
| 4,275,370 | 6/1981 | Sims | 337/140 X |

FOREIGN PATENT DOCUMENTS

| | | | |
|---|---|---|---|
| 2402613 | 7/1975 | Fed. Rep. of Germany | 200/339 |
| 0540803 | 6/1956 | Italy | 335/155 |
| 0729682 | 4/1980 | U.S.S.R. | 335/18 |

*Primary Examiner*—William M. Shoop, Jr.
*Assistant Examiner*—Bentsu Ro
*Attorney, Agent, or Firm*—Finnegan, Henderson, Farabow, Garrett & Dunner

[57] ABSTRACT

A switch device for controlling an electric motor which is used, for example, in a power window or sunroof of an automobile. The switch device includes a magnetically attractive piece, an electromagnet, sets of electrical switch contacts, and a spring coil of an alloy which, when heated to a predetermined temperature after being compressed, is restored to a released position.

11 Claims, 15 Drawing Figures

MOTOR CONTROLLING SWITCH DEVICE

BACKGROUND OF THE INVENTION

This invention relates to a motor controlling switch device for controlling an electric motor which is used in a power window regulator, power sunroof, power curtain or the like of an automobile.

A power window regulator of an automobile is equipped with a switch device which includes a knob and a holding switch. The knob is situated in a casing so that a restoring force is applied to the knob at all times keeping it in its primary position. The knob is moved from the primary position to a first operating position by pushing it. The knob is turned from the first operating position to a second operating position by pushing it again. Thus, the knob is designed to operate in two steps. A motor operating switch is provided which is in the on position when the knob takes the first or second operating position. The first or second operating position completes the electric circuit for forward or reverse rotation of the motor, or vice versa depending upon the wiring arrangement selected, for opening or closing the window, depending upon the mechanical coupling arrangement between the motor and the window.

A holding switch also is provided which, when the knob is moved to the second operating position, is turned on to apply current to an electromagnetic solenoid adapted to attract and hold the knob at the second operating position. Therefore, when the knob is turned to the first operating position, the window glass is continuously moved to open or close the window as long as the knob is kept at the first operating position. When the knob is set at the second operating position, the window glass is moved until the window is fully opened or fully closed even if the knob is released. When the window has been fully opened or closed, the driving motor is stopped in locking manner.

In order to overcome this difficulty, heretofore, a detecting device is employed which is designed as follows. The detecting device, including a contactor to which direct current is applied, is brought into contact with a sector wheel which is coupled to a lever to directly move the window glass. The sector wheel is engaged with a pinion driven by the motor detecting circuit for detecting spike-shaped noises which are induced in the contactor as the contact resistance changes with movement of the sector wheel. A transistor is connected in series to the above-described electromagnetic solenoid, the transistor being turned on as long as the detecting circuit detects the noises. When the detecting circuit detects no noise, i.e., when the motor is stopped in locking manner with the window fully opened or closed, the transistor is turned off. Consequently, the current applied to the electromagnetic solenoid is turned off and the knob is returned to its original position to deenergize the motor. The detecting device is intricate in construction, and the power window regulator switch device is large in size, high in manufacturing cost, and requires a relatively large installation space.

In view of the foregoing, an objective of this invention is to provide a motor controlling switch device in which, when the motor is stopped in locking manner, an operating member adapted to operate a switch for applying current to the motor is returned from its operating position to its original position. The motor controlling switch is simple in arrangement, small in size and low in manufacturing cost and which can be installed in a small space.

SUMMARY OF THE INVENTION

The feature of the invention resides in a motor controlling switch device in which, when an operating member is moved from its original position to an operating position, a switch is turned on to supply current to an electric motor is provided on the casing; an electromagnetic device for receiving current through the switch to attract and hold the operating member at the operating position is provided on the casing; and a restoring member of configuration storing alloy which is deformed by the operating member is disposed between the casing and the operating member, and in which the current flowing in the motor is supplied to the restoring member, and the restoring member, being heated by the locking current which flows when the motor is stopped in locking manner, is restored to have the stored configuration, whereby the operating member is returned to the original position against the attraction force of the electromagnetic device which tends to hold the operating member at the operating position.

According to an embodiment of the present invention, a motor controlling switch is provided comprising a casing with a first and second pair of electrical switch contacts in the casing and a knob pivotally mounted in the casing for operating the first and second pair of electrical contacts. First and second means for biasing the knob are used to keep the knob in a primary position, and are electrically coupled in series to the electrical switch contacts. A magnetically attractive piece which can be iron is mounted under the knob. Means for generating a magnetic field located under the knob maintains the knob in a depressed state, after it is depressed.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

DESCRIPTION OF THE PREFERRED EMBODIMENTS

Reference will now be made in detail to the present preferred embodiments of the invention, examples of which are illustrated in the accompanying drawings.

A first embodiment of the invention, which is a power window regulator switch device for an automobile, will be described with reference to FIGS. 1–6.

First, the entire arrangement of the switch device will be described. A substantially rectangular plastic casing 1 has a substantially rectangular insertion opening 2 formed in its top wall. A protrusion 4 having a supporting recess 3 is extended from the central portion of the bottom wall of the casing 1. The supporting recess 3 has surfaces 3*a* and 3*b* which are sloped upward from the center in a "V" shape. The sloped surfaces 3*a* and 3*b* have steps 3*c* and 3*d* in the middle, respectively.

Figure 1:
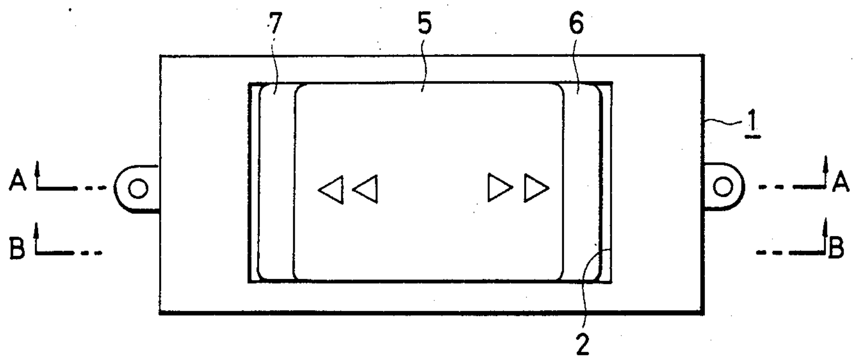
FIG. 1 shows a top view of a motor controlling switch.
Figure 2:
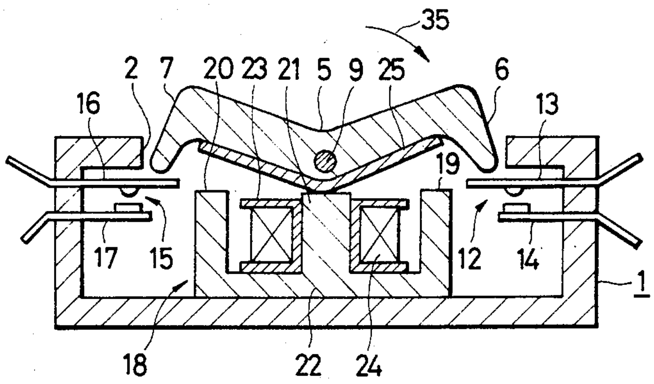
FIG. 2 shows a cross-sectional view of the first embodiment of the present invention taken along line A—A of FIG. 1.
Figure 3:
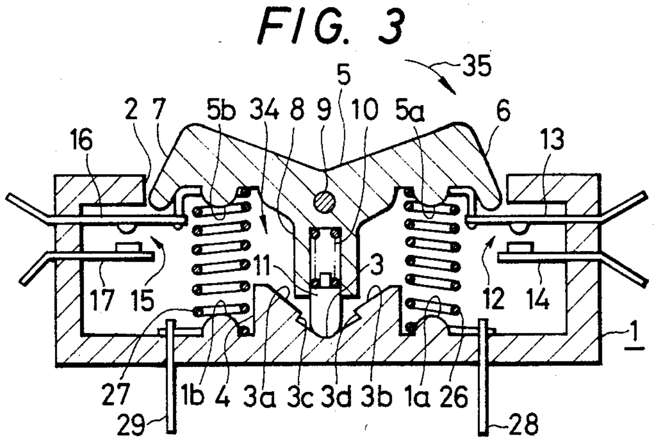
FIG. 3 shows a cross-sectional view of the first embodiment of the present invention taken along line B—B of FIG. 1.

In FIGS. 2 and 3, a substantially rectangular plastic knob 5 has a central part and right-hand and left-hand parts which are sloped upward from the central portion of the "V" shape. Depressing protrusions 6 and 7 are extended downward from the ends of the right-hand and left-hand parts, respectively. A cylinder 8 is extended downward from the central part. The knob 5 is pivotally mounted on a pin 9 extended between the upper portions of the front and rear walls of the casing 1 in such a manner that the knob 5 fits in the insertion opening 2. A depressing piece 11 and a compression coil spring 10 are fitted in the cylinder 8 in such a manner that the compression coil spring 10 pushes the depressing piece 11 against the bottom of the supporting recess so that the knob 5 is maintained at its primary position. At the primary position, the right-hand and left-hand parts of the knob 5 protrude above the insertion opening 2. The protrusion 4 having the supporting recess 3, the cylinder 8, the compression coil spring 10 and the depressing piece 11 form a restoring mechanism 34 for providing a restoring force.

A first switch 12 is provided on the upper part of the right wall of the casing 1. The first switch 12 comprises: a movable contact piece 13 made of a leaf spring and a stationary contact piece 14 provided below the movable contact piece 13. Normally the movable contact piece 13 is held apart from the stationary contact piece 14; that is, the first switch 12 is a normally open switch. The depressing protrusion 6 of the knob 5 causes the upper surface of the end portion of the movable contact piece 13 to close first switch 12. Similarly, a second switch 15 is provided on the upper part of the left wall of the casing 1. The second switch 15 comprises a movable contact piece 16 made of a leaf spring and a stationary contact piece 17 provided below the movable contact piece 16. The movable contact piece 16 is normally maintained apart from the stationary contact piece 17; that is, the second switch is also a normally open switch. Depressing protrusion 7 of the knob 5 causes the upper surface of the end portion of the movable contact piece 16 to close second switch 15.

An electromagnetic device 18 is provided at the center of the bottom wall of the casing 1. The device 18 comprises: a substantially E-shaped iron core 22 set horizontally, the iron core having right, left and central legs 19, 20 and 21; a bobbin 23 put fixedly on the central leg 21; and a voltage coil 24 wound on the bobbin 23 in a predetermined direction.

An attracting piece which can be an iron piece 25 is fixedly secured to the lower surface of the knob 5. The lowermost portion of the movable iron piece 25, i.e., the middle portion of the movable iron piece 25, is brought into or out of engagement with the upper end face of the central leg 21, and the right and left end portions of the movable iron piece 25 are confronted with the upper end faces of the right and left legs 19 and 20, respectively.

In FIG. 3, reference numerals 26 and 27 designate restoring members of configuration storing alloy, which are coil springs in the embodiment. Each coil spring stores its stretched configuration. When it is heated to a predetermined temperature after being compressed, the configuration is restored automatically to the stretched configuration. The restoring member 26 is interposed between the right end portion of the knob 5 and the bottom wall of the casing 1. More specifically, the upper end portion of the restoring member 26 is held by a holding protrusion 5*a* extended from the lower surface of the right end portion of the knob 5 and is electrically coupled to the end portion of the movable contact piece 13, while the lower end portion of the restoring member 26 is held by a holding protrusion 1*a* extended from the upper surface of the bottom wall of the casing 1 and is electrically coupled to a terminal 28 provided in the bottom wall of the casing. Similarly, the restoring member 27 is interposed between the left end portion of the knob 5 and the bottom wall of the casing 1. The upper end portion of the restoring member is held by a holding protrusion 5*b* extended from the lower surface of the left end portion of the knob 5 and is electrically connected to the end portion of the movable contact piece 16. The lower end portion of the restoring member 27 is held by a holding protrusion 1*b* extended from the upper surface of the bottom wall of the casing and is electrically coupled to a terminal 29 provided in the bottom wall of the casing 1.

Figure 6:
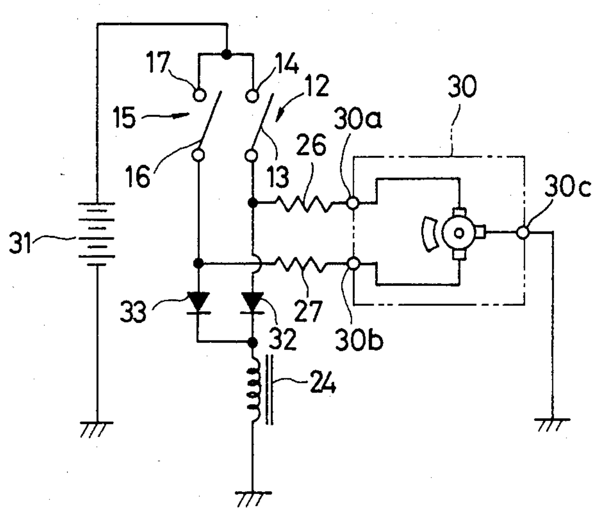
FIG. 6 illustrates an electrical circuit diagram of the motor controlling switch according to the first embodiment of the present invention.
Figure 7:
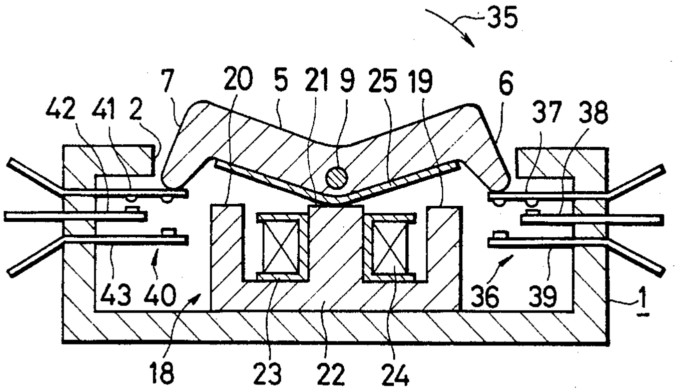
FIG. 7 shows a cross-sectional view of the second embodiment of the present invention taken along line A—A of FIG. 1.

The electrical circuit of the switch device will be described with reference to FIG. 6. In FIG. 6, a three-brush type motor 30 is used for driving an automobile's power window regulator. The motor has a forward rotation terminal 30*a*, a reverse rotation terminal 30*b* and a common terminal 30*c*. When motor 30 is rotated in the forward direction, the window glass is moved downwardly to open the window; when it is rotated in the reverse direction, the window glass is moved upwardly to close the window. The electrical circuit includes a DC source, which can be a battery 31. Battery 31 has a negative terminal grounded, and a positive terminal connected to the stationary contact pieces 14 and 17 of the switches 12 and 15. The movable contact pieces 13 and 16 of the switches 12 and 15 are connected through the restoring members 26 and 27 to the forward rotation terminal 30*a* and the reverse rotation terminal 30*b* of the motor 30, respectively. The movable contact pieces 13 and 16 are further connected respectively through diodes 32 and 33 to one terminal of the voltage coil 24, the other terminal of which is grounded. The command terminal 30*c* of the motor 30 is grounded.

Figure 4:
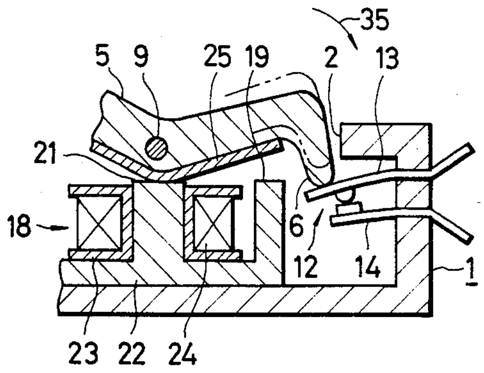
FIG. 4 shows a first operating position of the motor controlling switch according to the first embodiment of the present invention.

The operation of the switch device thus constructed will be described. When the right end portion of the knob 5 is depressed to turn the knob 5 in the direction of the arrow 35, the depressing piece 11 rides the sloped surface 3*a* of the supporting recess 3 while compressing the compression coil spring 10, and abuts against the step 3*c* with resistance. Thus, the knob 5 has been set at a first operating position for the opening operation. In this operation, the restoring member 26 is also compressed by the knob 5. When the knob 5 is at the first operating position, the right end portion of the movable iron piece 25 is spaced apart from the upper end face of the leg 19 of the iron core 22 as shown in FIG. 4. When the knob 5 takes the first operating position as described above, the depressing protrusion 6 pushes the movable contact piece 13 of the first switch 12 downwardly so that the contact thereof is brought into contact with the contact of the stationary contact piece 14, turning on switch 12. As a result, the supply voltage is applied between the forward rotation terminal 30*a* and the common terminal 30*c* of the motor through the restoring member 26, so that the motor 30 is rotated in the forward direction to move the window glass plate downwardly to open the window.

When the first switch 12 is turned on as described above, the voltage of the battery 31 is applied through the diode 32 to the voltage coil 24 to induce a magnetic force therein. However, when the knob 5 is at the first operating position, the right end portion of the movable iron piece 25 is not attracted by the magnetic force, because it is spaced apart from the upper end face of the leg 19 as described above. On the other hand, the current flowing in the motor flows in the restoring member 26. However, the amount of current flowing in the motor 30 is small during its steady operation, and therefore the restoring member 26 is not heated by the current, i.e., it is maintained at its ordinary temperature.

When the knob 5 is released, the elastic force of the compression coil spring 10 in combination with the inclination of the sloped surface 3*a* of the supporting recess 3 causes the depressing piece 11 to slide down the sloped surface 3*a;* i.e., the knob 5 is turned in the direction opposite to the direction of the arrow 35 to its original position as shown in FIGS. 2 or 3, and the first switch 12 is turned off. As the knob 5 is turned, the restoring member 26 is also restored to its stretched state. Thus, the window glass has been stopped at the desired position; i.e., the window has been opened to the desired degree.

Figure 5:
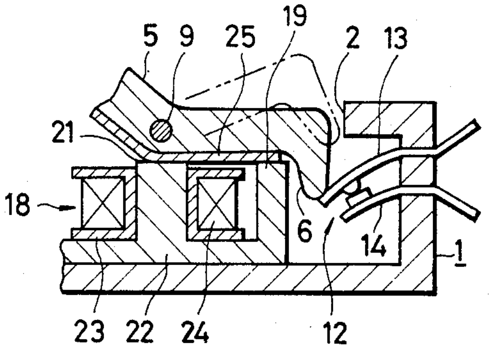
FIG. 5 shows a second operating position of the motor controlling switch according to the first embodiment of the present invention.

When the knob 5 at the first operating position is depressed so that it is further turned in the direction of the arrow 35, the depressing piece 11 is moved over the step 3*c* of the sloped surface 3*a.* Thus, the knob 5 has taken a second operating position as shown in FIG. 5. In this operation, the restoring member 26 is compressed by the knob 5. When the knob 5 is at the second operating position, the right end portion of the movable iron piece 25 comes near or abuts against the upper end face of the leg 19 of the iron core 22. In this case, the first switch 12 is maintained turned on and the supply voltage is applied to the voltage coil 24. Accordingly, the magnetic force of the leg 19 of the iron core 22 attracts the right end portion of the movable iron piece 25 so that the knob 5 is held at the second operating position. Therefore, even if the force of depression is removed from the knob 5, the first switch 12 is maintained turned on and the motor 30 continuously moves the window glass downwardly.

When the window glass reaches its lowest position, i.e., when the window is fully opened, the motor 30 is stopped in locking manner, and a large locking current flows in the motor 30. The locking current flows in the restoring member 26, to heat the latter. When the temperature of the restoring member 26 is raised to a predetermined value, the restoring member 26 is restored to have the stretched configuration shown in FIG. 3 which has been stored. In this connection, the restoring force is designed so that it is smaller than the magnetic attraction force of the movable iron piece 25 which is provided by the electromagnetic device 18. Accordingly, the depressing piece 11 slides down the sloped surface 3*a* of the supporting recess 3, and simultaneously the knob 5 is returned to its original position. Thus, the first switch 12 is turned off.

The case where the window glass is moved downwardly by turning the knob 5 in the direction of the arrow 5 has been described. In the case where the left end portion of the knob 5 is depressed so that the knob 5 is turned in the direction opposite to the direction of the arrow 5, the switch device operates on the same operating principle. When the left end portion of the knob 5 is depressed, the depressing piece 11 is caused to ride the sloped surface 3*b* of the supporting recess 3 and abuts against the step 3*d.* Thus, the knob 5 has taken a first operating position for the closing operation. When the left end portion of the knob 5 is further depressed, the depressing piece 11 is moved over the step 3*d* of the sloped surface 3*b,* so that the knob 5 takes a second operating position for the closing operation.

When the knob 5 is moved to the first or second operating position, the restoring member 27 is compressed by the knob 5, while the depressing protrusion of the knob 5 depresses the movable contact piece 16 to turn on the second switch 15. As a result, the supply voltage is applied between the reverse rotation terminal 30*b* and the command terminal 30*c* of the motor through the restoring member 27, so as to rotate the motor 30 in the reverse direction thereby to move the window glass upwardly to close the window.

When the second switch 15 is turned on, the supply voltage is applied through the diode 33 to the voltage coil 24. Therefore, when the knob 5 is moved to the second operating position, the left end portion of the movable iron piece 25 is attracted by the leg 20 of the iron core 22, so that the knob 5 is held at the second operating position. If, in this case, the knob 5 is at the first operating position, upon removal of the depression force the knob 5 is returned to its original position with the aid of the sloped surface 3*b,* the compression coil spring 10 and the depressing piece 11, and the second switch 15 is therefore turned off. When, on the other hand, the knob 5 is at the second position, even if the depression force is eliminated, the knob 5 is held at the second operating position and the second switch 15 is therefore turned on. Thereafter, when the window glass reaches its uppermost position to fully close the window, the motor is stopped in locking manner and the locking current flows in the motor 30 and the restoring member 27. As a result, the restoring member 27 is automatically restored to have its stretched configuration; i.e., the knob 5 is returned to its original position against the magnetic attraction force of the leg 20 of the iron core 22 which acts on the left end portion. Thus, the second switch 15 is turned off.

The above-described embodiment has the following characteristics. In the switch device of the invention, the electromagnetic device 18 having the voltage coil 24 to which the supply voltage is applied through the first switch 12 or the second switch 15 to hold the knob 5 at the second operating position is provided on the casing 1. The restoring members 26 and 27 are interposed between the right end portion of the knob 5 and the bottom wall of the casing 1 and between the left end portion of the knob and the bottom wall of the casing, respectively. The current flowing in the motor 30 is allowed to flow in the restoring member 26 or 27. When the motor 30 is stopped in locking manner with the window fully opened or closed, the restoring member 26 or 27 is restored to have its stretched configuration being heated by the locking current. As a result, the knob 5 is automatically returned to its original position against the magnetic attraction force of the electromagnetic device 18 so as to turn off the first switch 12 or the second switch 15. Accordingly, the switch device of the invention, unlike the conventional one, does not need to use the detecting device which makes the switch device intricate in construction and high in manufacturing cost. Furthermore, for the same reason, the switch device of the invention can be made simple in construction and small in size as a whole, and it can be installed in a relatively small space. In addition, in the motor controlling switch device of the invention, the steps 3*c* and 3*d* are formed in the sloped surfaces 3*a* and 3*b* of the supporting recess 3, respectively, which are used in cooperation with the compression coil spring 10 and the depressing piece 11 to return the knob 5 to its original position from the first or second operating position. Therefore, the knob 5 is moved from the first operating position to the second operating position with resistance because of the presence of the steps 3*c* and 3*d*. Accordingly, the difficulty with which the knob 5 is carelessly moved to the second operating position is eliminated according to the invention. Diodes 32 and 33 prevent a reverse current. First switch 12 which rotates the motor 30 in the forward direction and the second switch 15 which rotates the motor in the reverse direction can be used as switches for applying the supply voltage to the voltage coil. Accordingly, although the switch device is operable in two steps with the knob 5 being moved to the first and second operating positions, the switches are used commonly for the steps. Therefore, the number of switches required can be reduced, and the circuitry is simple.

A second embodiment of the invention is as shown in FIGS. 7–10. In these figures, those components which have been previously described with reference to the first embodiment in FIGS. 1–6 are therefore designated by the same reference numerals or characters. Only the different components will be described.

In FIGS. 7–10, reference numeral 36 designates a first switch provided in the upper portion of the right wall of the casing 1 (instead of the above-described first switch 12). The first switch 36 is made up of a movable contact piece 37 and stationary contact pieces 38 and 39 which are laid in a manner such that the contact which is provided at the middle of the movable contact piece 37 encounters the contact of the stationary contact piece 38. The contact which is provided at the end of the movable contact piece 37 encounters the contact of the stationary contact piece 39. Similarly, a second switch 40 is provided in the upper portion of the left wall of the casing 1 (instead of the second switch 15 in the first embodiment). The second switch 40 is made up of a movable contact piece 41 and stationary contact pieces 42 and 43 which are laid in such a manner that the contact which is provided at the middle of the movable contact piece 41 encounters the contact of the stationary contact piece 42. The contact which is provided at the end of the movable contact piece 41 encounters the contact of the stationary contact piece 43.

Figure 10:
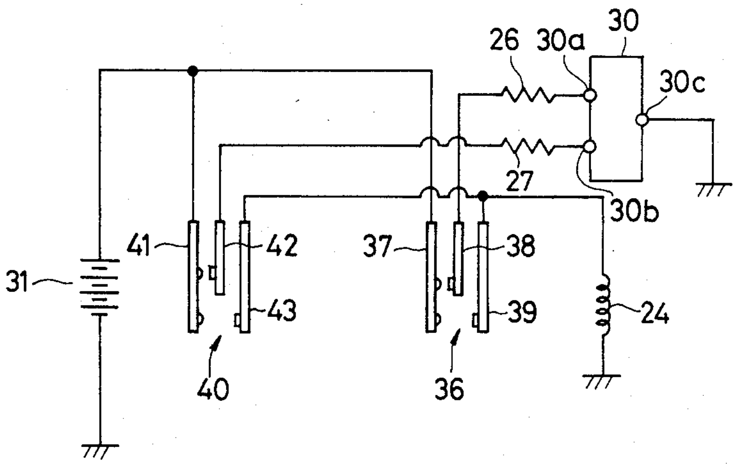
FIG. 10 illustrates an electrical circuit diagram of the motor controlling switch according to the second embodiment of the present invention.

As shown in FIG. 10, the movable contact pieces 37 and 41 of the switches 36 and 40 are connected to the positive terminal of the battery 31, the stationary contact pieces 38 and 42 are connected through the restoring members 26 and 27 to the forward rotation terminal 30*a* and the reverse rotation terminal 30*b* of the motor 30, respectively. The stationary contact pieces 39 and 43 are connected to one terminal of the voltage coil 24, the other terminal of which is grounded.

Figure 8:
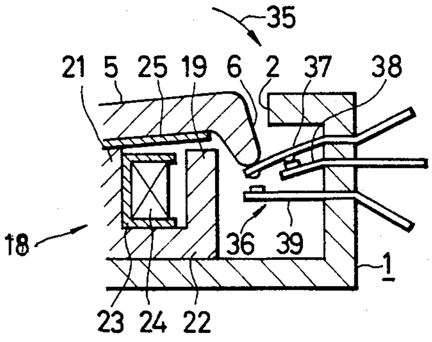
FIG. 8 shows a first operating position of the motor controlling switch according to the second embodiment of the present invention.
Figure 9:
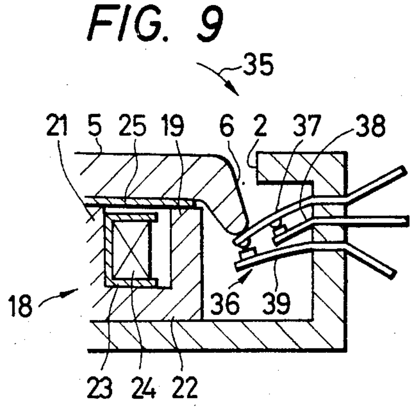
FIG. 9 shows a second operating position of the motor controlling switch according to the second embodiment of the present invention.

When the knob 5 is turned in the direction of the arrow 35 so as to take the first operating position for the opening operation, the movable contact piece 37 of the first switch 36 is pushed downwardly by the depressing protrusion 6 of the knob 5 so that the middle contact of the movable contact piece 37 is brought into contact with the stationary contact piece 38 (as shown in FIG. 8). As a result, the voltage of the battery 31 is applied between the forward rotation terminal 30*a* and the common terminal 30*c* of the motor 30 through the restoring member 26, so that the motor 30 is rotated in the forward direction. When the knob 5 is further turned in the direction of the arrow 35 to take the second operating position, the end contact of the movable contact piece 37 of the first switch 36 is brought into contact with the stationary contact piece 39 with the middle contact of the movable contact piece 37 maintained in contact with the stationary contact piece 38 (as shown in FIG. 9). As a result, the supply voltage is applied to the voltage coil 24.

When the knob 5 is turned in the direction opposite to the direction of the arrow 35, the operations are substantially the same as those in the above-described case. When the knob takes tne first operating position for the closing operation, the movable contact piece 41 of the second switch 40 is brought into contact with the stationary contact piece 42 so that the motor 30 is turned in the opposite direction. When the knob takes the second operating position for the closing operation, the movable contact piece 41 of the second switch 40 is brought into contact with the stationary contact piece 43 in addition to the stationary contact piece 42, so that the supply voltage is applied to the voltage coil 24.

Accordingly, the second embodiment has substantially the same effect as those of the above-described first embodiment.

A third embodiment of the invention is as shown in FIGS. 11–14. In these figures, those components which have been previously described with reference to the first embodiment in FIGS. 1–6 are therefore designated by the same reference numerals or characters. Only the different components will be described.

Figure 11:
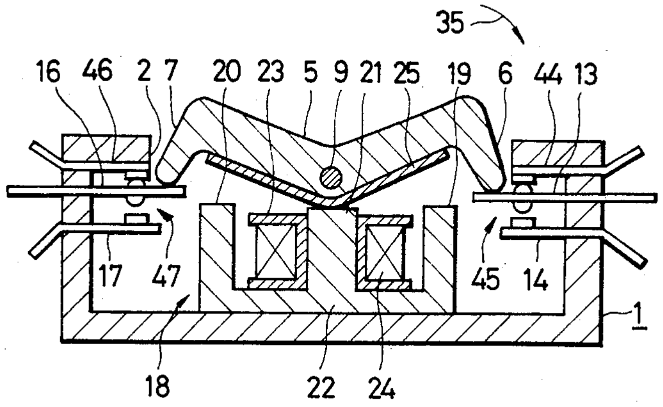
FIG. 11 shows a cross-sectional view of the third embodiment of the present invention taken along line A—A of FIG. 1.
Figure 12:
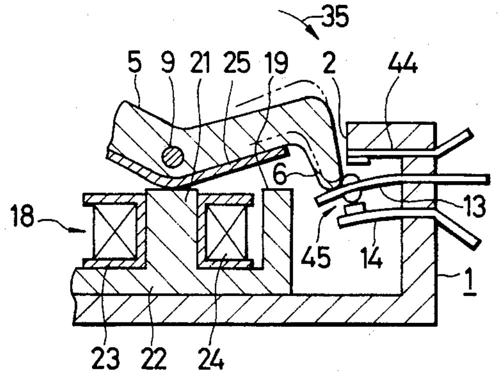
FIG. 12 shows a first operating position of the motor controlling switch according to the third embodiment of the present invention.
Figure 13:
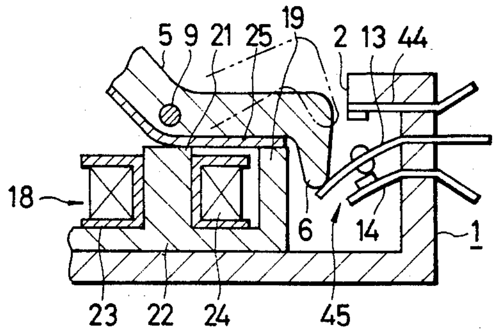
FIG. 13 shows a second operating position of the motor controlling switch according to the third embodiment of the present invention.

In the third embodiment, as shown in FIGS. 11, 12 and 13, instead of the first and second switches 12 and 15, first and second change-over switches 45 and 47 are provided respectively. The first change-over switch 45 is formed by providing a stationary contact piece 44 above the movable contact piece 13 in such a manner that the contact of the stationary contact piece 44 is in contact with the movable contact piece 13. Similarly, the second change-over switch 47 is formed by arranging a stationary contact piece 46 above the movable contact piece 16 in such a manner that the contact of the stationary contact piece 46 is in contact with the movable contact piece 16.

Figure 14:
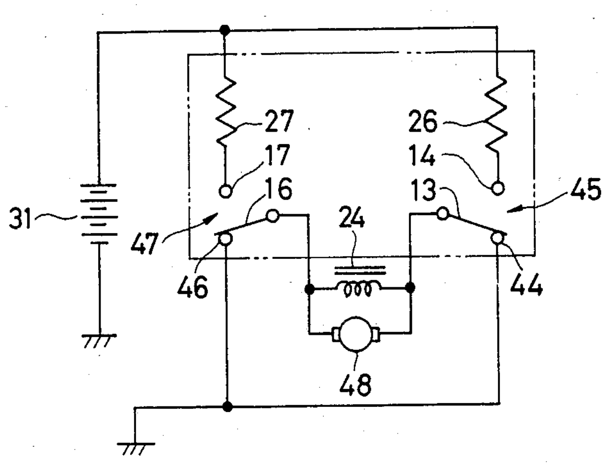
FIG. 14 illustrates an electrical circuit diagram of the motor controlling switch according to the third embodiment of the present invention.

As shown in FIG. 14, the stationary contact pieces 14 and 17 of the change-over switches 45 and 47 are connected respectively through the restoring members 26 and 27 to the positive terminal of the battery 31, and the stationary contact pieces 44 and 46 are grounded. A two-brush type motor 48 (instead of the motor 30) is connected between the movable contact pieces 13 and 16. The motor 48 is shunted by the voltage coil 24.

When the knob 5 is turned in the direction of the arrow 5 to take the first or second operating position for the opening operation in the first change-over switch 45 (corresponding to the first switch 12 of the first embodiment), the movable contact piece 13 is brought into contact with the stationary contact piece 14 (as shown in FIGS. 12 or 13), so that the supply voltage is applied to the series circuit of the restoring member 26 and the motor 48 and to the voltage coil 24 through the restoring member 26. As a result, current flows in the motor 48 in one direction so that the motor 48 is rotated in the forward direction.

When, on the other hand, the knob 5 is turned in the opposite direction to take the first or second operating position for the closing operation, in the second change-over switch 47 (corresponding to the second switch 15 of the first embodiment), the movable contact piece 16 is brought into contact with the stationary contact piece 17. Therefore, the supply voltage is applied to the series circuit of the restoring member 27 and the motor 48 and to the voltage coil 24 through the restoring member 27. As a result, current flows in the motor 48 in the opposite direction so that the motor 48 is rotated in the reverse direction.

Accordingly, the third embodiment has substantially the same effects as the first embodiment.

Figure 15:
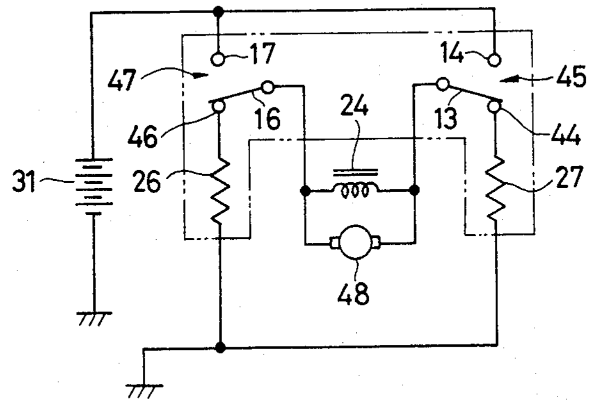
FIG. 15 illustrates an electrical circuit diagram of the motor controlling switch according to the fourth embodiment of the present invention.

A fourth embodiment of the invention is as shown in FIG. 15. The fourth embodiment is different from the above-described third embodiment in the following points. The stationary contact pieces 14 and 17 of the change-over switches 45 and 47 are connected directly to the positive terminal of the battery 31, and the restoring member 26 is connected between the stationary contact piece 46 of the second change-over switch 47 and the ground, while the restoring member 27 is connected between the stationary contact piece 44 of the first change-over switch 45 and the ground. The effects of the fourth embodiment are substantially the same as those of the above-described third embodiment.

In the above-described embodiments, the technical concept of the invention is applied to the power window regulator switch devices; however, it should be noted that the invention is not limited thereto or thereby. That is, the technical concept of the invention is applicable of all motor controlling switch devices such as power sunroof switch devices and power curtain switch devices. In this case, the switch device may be so designed that the knob 5 is moved from its original position directly to the second operating position.

While the invention has been described in connection with the preferred embodiments, it will be obvious to those skilled in the art that various changes and modifications may be made therein without departing from the spirit or scope of the invention.

What is claimed is:

1. A motor controlling switch comprising:
a. a casing;
b. an operating member provided in said casing wherein said operating member is movable between a primary position and an operating position;
c. a switch located in said casing wherein when said operating member is in an operating position said switch is in the on position;
d. an electromagnetic device located in said casing, said electromagnetic device being connected to said switch, wherein said electromagnetic device holds said operating member in an operating position after said operating member has been moved to an operating position;
e. a restoring member located between said casing and said operating member wherein said restoring member is deformed when said operating member is in an operating position, and said restoring member is a material which restores said restoring member to a normal shape when heated with an electric current.

2. A motor controlling switch, comprising:
a. a casing;
b. first and second pair of electrical switch contacts in said casing;
c. a knob pivotally mounted in said casing for operating said first and second pair of electrical switch contacts;
d. first and second means for biasing said knob in a primary position, said first and second biasing means being coupled in series electrically to said first and second pair of electrical switch contacts, respectively;
e. a magnetically attractive piece mounted under said knob; and
f. means located under said knob for generating a magnetic field for holding said knob in a depressed position.

3. The motor controlling switch in claim 2 wherein said biasing means includes a spring coil of a material which, when heated to a predetermined temperature after being compressed, is restored to a released position.

4. The motor controlling switch in claim 3 wherein said generating means includes an electromagnet.

5. A power window regulator of an automobile, comprising:
a. a motor controlling switch including
(1) a casing,
(2) first and second pair of electrical switch contacts in said casing,
(3) a knob pivotally mounted in said casing for operating said first and second pair of electrical switch contacts,
(4) first and second means for mechanically biasing said knob in a primary position, said biasing means being electrically coupled in series to said first and second pairs of electrical switch contacts, respectively, (5) a magnetically attractive piece mounted under said knob, (6) means located under said knob for generating a magnetic field for holding said knob in a depressed position;

b. a three-brush type motor having a forward rotation terminal, a reverse rotation terminal and a common terminal wherein said first and second biasing means are electrically coupled to said forward and reverse rotation terminals, respectively, and said magnetic field generating means is coupled to said common terminal;

c. a voltage source having a first terminal coupled to said first and second electrical switch contacts, and having a second terminal coupled to said common terminal; and d. first and second diodes coupled to said first and second pairs of electrical switch contacts, and to said magnetic generating means.

6. A motor controlling switch, comprising:

a. a casing;

b. first and second sets of electrical switch contacts in said casing, wherein each set includes a movable contact and two stationary contacts;

c. a knob pivotally mounted in said casing for operating said first and second sets of electrical switch contacts;

d. first and second means for mechanically biasing said knob in a primary position, said first and second biasing means being electrically coupled in series to said first and second sets of electrical switch contacts, respectively;

e. a magnetically attractive piece mounted under said knob; and f. means located under said knob for generating a magnetic field for holding said knob in a depressed state.

7. The motor controlling switch in claim 6 wherein said biasing means includes a spring coil of an alloy which, when heated to a predetermined temperature after being compressed, is restored to a released position.

8. The motor controlling switch according to claim 6 wherein said generating means includes an electromagnet.

9. A power window regulator of an automobile comprising:

a. a motor controlling switch including (1) a casing, (2) first and second sets of electrical switch contacts in said casing, wherein each set includes a movable contact and two stationary contacts, (3) a knob pivotally mounted in said casing for operating said first and second pair of electrical switch contacts, (4) first and second means for mechanically biasing said knob in a primary position, said biasing means being electrically coupled in series to said first and second sets of electrical switch contacts, respectively, (5) a magnetically attractive piece mounted under said knob, and (6) means located under said knob for generating a magnetic field for holding said knob in a depressed state;

b. a three-brush type motor having a forward rotation terminal, a reverse rotation terminal and a common terminal connected to said magnetic generating means, wherein said first and second biasing means are electrically coupled to said forward and reverse terminals, respectively, and said magnetic field generating means is coupled to said common terminal; and c. a voltage source having a first terminal coupled to said first and second set of electrical switch contacts, respectively, and having a second terminal coupled to said common terminal.

10. The motor controlling switch in claim 9 wherein said biasing means includes a spring coil of an alloy which, when heated to a predetermined temperature after being compressed, is restored to a released position.

11. The motor controlling switch according to claim 9 wherein said generating means includes an electromagnet.

* * * * *